United States Patent
Asami et al.

(10) Patent No.: US 8,004,703 B2
(45) Date of Patent: Aug. 23, 2011

(54) IMAGE DATA OBTAINING SYSTEM, DIGITAL COMPOUND MACHINE AND SYSTEM MANAGEMENT SERVER

(75) Inventors: Noriko Asami, Kanagawa (JP); Kohji Kanbara, Kanagawa (JP); Junichi Ota, Tokyo (JP); Toshimichi Ooura, Saitama (JP); Yasushi Okada, Tokyo (JP); Yoshiroh Someya, Kanagawa (JP); Shinji Usami, Tokyo (JP); Mamoru Murata, Tokyo (JP); Kenichi Maekawa, Tokyo (JP); Mitsuru Fukushima, Tokyo (JP)

(73) Assignees: Ricoh Company, Ltd., Tokyo (JP); Otsuka Corporation, Tokyo (JP); Osk Co., Ltd., Tokyo (JP)

( * ) Notice: Subject to any disclaimer, the term of this patent is extended or adjusted under 35 U.S.C. 154(b) by 1058 days.

(21) Appl. No.: 11/184,846

(22) Filed: Jul. 20, 2005

(65) Prior Publication Data
US 2006/0017967 A1      Jan. 26, 2006

(30) Foreign Application Priority Data
Jul. 23, 2004   (JP) ................................ 2004-215701

(51) Int. Cl.
*G06F 3/12*   (2006.01)
(52) U.S. Cl. ..................... 358/1.15; 358/1.14; 358/1.13; 715/221; 715/222; 715/223; 715/224; 715/226
(58) Field of Classification Search .................. 358/471, 358/1.14, 1.15, 1.13; 715/226, 221–224
See application file for complete search history.

(56) References Cited

U.S. PATENT DOCUMENTS

| | | | | |
|---|---|---|---|---|
| 4,970,554 A | * | 11/1990 | Rourke | 399/84 |
| 5,809,218 A | * | 9/1998 | Kastenholz et al. | 358/1.16 |
| 6,052,198 A | * | 4/2000 | Neuhard et al. | 358/1.15 |
| 7,130,066 B1 | * | 10/2006 | Kanematu | 358/1.15 |
| 7,215,434 B1 | * | 5/2007 | Janse et al. | 358/1.15 |
| 2002/0181804 A1 | | 12/2002 | Simpson et al. | |
| 2004/0032618 A1 | * | 2/2004 | Yano et al. | 358/1.16 |
| 2004/0103367 A1 | * | 5/2004 | Riss et al. | 715/506 |
| 2004/0117258 A1 | | 6/2004 | Kanbara | |
| 2004/0125414 A1 | * | 7/2004 | Ohishi et al. | 358/402 |

FOREIGN PATENT DOCUMENTS

| EP | 749077 A2 * | 12/1996 |
|---|---|---|
| EP | 0 989 500 A2 | 3/2000 |
| EP | 989500 A2 * | 3/2000 |
| EP | 1 283 485 A1 | 2/2003 |

(Continued)

*Primary Examiner* — Chan S Park
*Assistant Examiner* — Jacky X Zheng
(74) *Attorney, Agent, or Firm* — Oblon, Spivak, McClelland, Maier & Neustadt, L.L.P.

(57) ABSTRACT

An image data obtaining system storing image data optically read from a digital compound machine into a database managed by a server connected to the digital compound machine via a network. The digital compound machine includes: a unit configured to generate an input screen based on input screen configuration information received from the server beforehand; a unit configured to send, to the server, the image data, image data information and a DB key value, wherein the image data information is for associating the image data with the input screen configuration information and is input from the input screen, and wherein the DB key value is for associating the database with the input screen configuration information. The server includes a unit configured to store the image data and/or the image data information into the database associating the image data and/or the image data information with the DB key value.

7 Claims, 18 Drawing Sheets

FOREIGN PATENT DOCUMENTS

| | | |
|---|---|---|
| EP | 1283485 A1 * | 2/2003 |
| JP | 2003-152972 | 5/2003 |
| JP | 2003-280844 | 10/2003 |
| JP | 2004-086494 | 3/2004 |
| KR | 2000-0056706 | 9/2000 |
| KR | 2003-0061500 | 7/2003 |

* cited by examiner

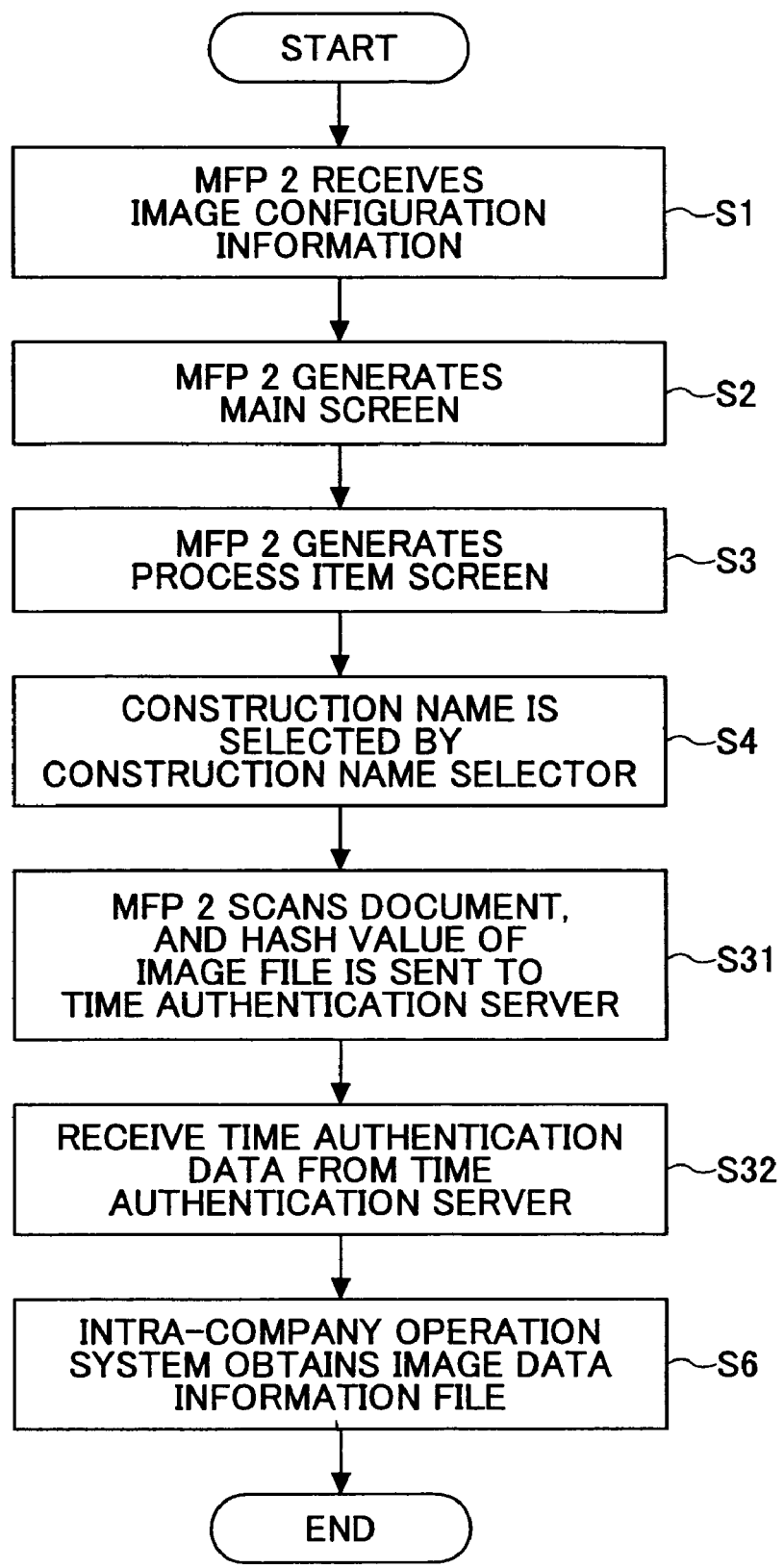

FIG.11

| PROCESS NAME | INPUT ITEM | INPUT TYPE | SELECTOR INFORMATION |
|---|---|---|---|
| CONSTRUCTION DESIGN DRAWING | CREATION DATE | TEN KEY | |
| | PERSON IN CHARGE | TEN KEY | |
| | CONSTRUCTION NAME | SELECTOR | AIUEO SELECTION (aiueo) |
| | | | AREA SELECTION (area) |
| | | | BRANCH NAME SELECTION (branch) |
| | CONSTRUCTION NUMBER | TEN KEY | |
| | NOTES | TEN KEY | |
| CONTRACT | CREATION DATE | TEN KEY | |
| | PERSON IN CHARGE | TEN KEY | |
| | CONSTRUCTION NAME | SELECTOR | AIUEO SELECTION (aiueo) |
| | | | AREA SELECTION (area) |
| | CONSTRUCTION NUMBER | TEN KEY | |
| | NOTES | TEN KEY | |
| ESTIMATE | …… | …… | |
| PROPOSAL | …… | …… | |

FIG.12

| SELECTOR INFORMATION | BUTTON NAME |
|---|---|
| aiueo | A |
| | I |
| | U |
| | ...... |
| | WA |
| area | OOMORI-HIGASHI |
| | OOMORI-NISHI |
| | ...... |
| | KAMATA-MINAMI |
| | KAMATA-KITA |
| branch | NISHI-TOKYO |
| | HIGASHI-TOKYO |

FIG.13

| SELECTOR INFORMATION | BUTTON NAME | ITEM NAME | DB KEY VALUE |
|---|---|---|---|
| aiueo | A | AOYAMABOENMAE RESIDENCE | 1001 |
| | | AOKI RESIDENCE | 1002 |
| | I | INOKI KAZUO RESIDENCE | 1011 |
| | ...... | ...... | ...... |
| | O | OOMORI BERUBO MANSION | 1041 |
| | | OOMORI EKIMAE APARTMENT | 1042 |
| | | OOMORI TARO RESIDENCE | 1043 |
| | | OOMORI JIRO RESIDENCE | 1044 |
| | | OOMORI SABURO RESIDENCE | 1045 |
| | | OOMORI SHIRO RESIDENCE | 1046 |
| | KA | KAKINOKIZAKA HEIGHTS | 1101 |
| | ...... | ...... | ...... |
| | WA | WADA AKIKO REJIDENCE | 1801 |
| area | OOMORI-HIGASHI | OOMORI BERUBO MANSION | 1041 |
| | | OOMORI EKIMAE APARTMENT | 1042 |
| | | OOMORI TARO RESIDENCE | 1043 |
| | | OOMORI JIRO RESIDENCE | 1044 |
| | | OOMORI SABURO RESIDENCE | 1045 |
| | | OOMORI SHIRO RESIDENCE | 1046 |
| | OOMORI-NISHI | CORPORATE HOUSE TANAKA | 1151 |
| | ...... | ...... | ...... |
| | KAMATA-KITA | SUN HEIGHTS KAMATA | 1204 |
| branch | NISHI-TOKYO | ...... | ...... |
| | ...... | ...... | ...... |
| | HIGASHI-TOKYO | ...... | ...... |
| | ...... | ...... | ...... |

FIG.14

| PROCESS DATE | EXECUTION PROCESS NAME | SELECTOR | INPUT BUTTON | FILE PATH |
|---|---|---|---|---|
| 2004.05.14 | CONSTRUCTION DESIGN DRAWING | AIUEO SELECTION | ○ | ¥¥ServerName¥Path¥Name |

| CREATION DATE | CODE OF PERSON IN CHARGE | CONSTRUCTION NAME | DB KEY VALUE | NOTES |
|---|---|---|---|---|
| 2004.05.14 | 1024 | OOMORI TARO RESIDENCE | 1043 | SUNNY HOUSE |

FIG.15

| PROCESS NAME | INPUT ITEM | INPUT TYPE | SELECTOR INFORMATION |
|---|---|---|---|
| CONSTRUCTION DESIGN DRAWING | CREATION DATE | TEN KEY | |
| | PERSON IN CHARGE | PERSONAL AUTHENTICATION | |
| | CONSTRUCTION NAME | SELECTOR | AIUEO SELECTION (aiueo) |
| | | | AREA SELECTION (area) |
| | | | BRANCH NAME SELECTION (branch) |
| | CONSTRUCTION NUMBER | TEN KEY | |
| | NOTES | TEN KEY | |
| CONTRACT | CREATION DATE | TEN KEY | |
| | PERSON IN CHARGE | TEN KEY | |
| | CONSTRUCTION NAME | SELECTOR | AIUEO SELECTION (aiueo) |
| | | | AREA SELECTION (area) |
| | CONSTRUCTION NUMBER | TEN KEY | |
| | NOTES | TEN KEY | |
| ESTIMATE | …… | …… | |
| PROPOSAL | …… | …… | |

FIG.17

CONSTRUCTION DESIGN DRAWING

| | | | |
|---|---|---|---|
| CREATION DATE | 2004/05/14 ~109 | CHANGE ~110 | |
| CODE OF PERSON IN CHARGE | 01024 ~111 | CHANGE ~112 | |
| CONSTRUCTION NAME SELECTOR | AIUEO SELECTION ~113 | AREA NAME SELECTION ~114 | BRANCH NAME SELECTION ~115 |
| CONSTRUCTION NAME | OOMORI TARO RESIDENCE ~116 | | |
| CONSTRUCTION NUMBER | 01024 ~117 | | |
| NOTES | SUNNY HOUSE ~118 | | CHANGE ~119 |

BACK ~120      ~121      OK

IMAGE DATA OBTAINING SYSTEM, DIGITAL COMPOUND MACHINE AND SYSTEM MANAGEMENT SERVER

BACKGROUND OF THE INVENTION

1. Field of the Invention

The present invention relates to an image data obtaining system that can cooperate with a digital compound machine. More particularly, the present invention relates to the image data obtaining system for storing image data scanned by the digital compound machine into a database of an intra-company information system, and relates to the digital compound machine and a system management server.

2. Description of the Related Art

In an intra-company system using computers, various business systems such as sales management, inventory control, customer information control, personnel management, production management, drawings management systems and the like are operating. In these business operation systems, inputting vouchers, updating files are necessary according to business operations on a daily basis.

In business operation activities, it is necessary to manage documents of various formats (atypical documents) such as drawings, sales reports and attached papers obtained as information. Since it is difficult to input information of these documents into the operation system, the documents are converted into image data files by using a scanner so that the files are stored. In addition, it is expected that written orders, billings and the like received from business connections are also converted to image files so as to be stored in a database according to paperless activities.

However, although it is necessary to convert the documents into the image files, cooperation with the operation system has not been considered. Therefore, when it is necessary to associate image file documents with predetermined files in the operation system and when it is necessary to input image data information such as contents of the documents and the date of the documents into the operation system, the association and the information input work need to be done separately from routine tasks of normal data input and update work in the operation system so that the efficiency is not good.

When a user obtains an atypical document in a client site or at a business trip destination, the user can perform input/update work associating the atypical document with the business system via a network using the user's own PC (personal computer). However, due to lack of IT skills, there are many cases where a user sends the atypical document itself to the user's belonging section by mail or FAX to request another employee to perform the input/update work. Especially, under circumstances where temporary staffs and part-time employees increase, it can be estimated that such a case increases. In addition, in a branch office, since it is difficult to keep IT skilled employees, it is desired to simplify operations and supports for the operation system.

SUMMARY OF THE INVENTION

An object of the present invention is to provide an image data obtaining system, a digital compound machine and a system management server that enable users to easily input documents in an electronic form by cooperating with an operation system.

The object is achieved by an image data obtaining system for storing image data optically read from a digital compound machine into a database managed by a server connected to the digital compound machine via a network, the digital compound machine including:

an input screen generation unit configured to generate an input screen based on input screen configuration information received from the server beforehand;

an image data information sending unit configured to send, to the server, the image data, image data information and a DB key value, wherein the image data information is for associating the image data with the input screen configuration information and is input from the input screen generated by the input screen generation unit, and wherein the DB key value is for associating the database with the input screen configuration information, the server including a DB storing unit configured to store the image data and/or the image data information received from the digital compound machine into the database associating the image data and/or the image data information with the DB key value.

According to the present invention, an image data obtaining system that enables users to easily input documents for storing them in an electronic form by cooperating with an operation system can be provided. The input screen configuration information that are sent from the server to the digital compound machine beforehand may be stored in an intermediate storing unit so as to be downloaded in the digital compound machine at a timing when the power of the digital compound machine is turned on, for example.

The object is also achieved by an image data obtaining system for storing image data optically read from a digital compound machine into a database managed by a server connected to the digital compound machine via a network, the digital compound machine including:

an input screen generation unit configured to generate an input screen based on input screen configuration information received from the server beforehand;

an image data information sending unit configured to send, to an intermediate data storing unit connected to the network, the image data, image data information and a DB key value, wherein the image data information is for associating the image data with the input screen configuration information and is input from the input screen generated by the input screen generation unit, and wherein the DB key value is for associating the database with the input screen configuration information, the server including a DB storing unit configured to store the image data and/or the image data information stored in the intermediate data storing unit into the database associating the image data and/or the image data information with the DB key value.

According to the present invention, an image data obtaining system that enables users to easily input documents for storing them in an electronic form by cooperating with an operation system can be provided. The intermediate data storing unit may be preferably a file server. When the server detects that image data is sent to the file server, the operation system can obtain the image data. The intermediate data storing unit may be independently connected to the network, or may be included in the server as a predetermined area of a hard disk.

The server may include a document management system for managing a document in addition to the operation system. Image data is stored and managed by the document management system, and the server may store the image data information in the database. The document management system may be an independent document management server.

In the image data obtaining system, the digital compound machine may include a user authentication unit configured to authenticate a user. By performing authentication for a user, it can be prevented that an invalid person inputs the image data.

In addition, in the image data obtaining system, the digital compound machine may include:

a time authentication data sending unit configured to send information on the image data to a time authentication server, connected to the network, for authenticating a time;

a time certification data receiving unit configured to receive a time certification data for the information on the image data from the time authentication server; and an authenticated image data sending unit configured to send the time certification data received from the time authentication server to the server or to the intermediate data storing unit associating the time certification data with the image data.

By adding, to the image data, a time stamp for certifying a time when the image data is obtained, the time when a document such as a voucher is converted to an image file can be certified. The information on the image data is information that can identify the image data, and preferably is a hash value of the image data. The information may be the image data itself or a part of the image data as long as the image data can be identified.

The object can be also achieved by a digital compound machine for sending optically read image data to a server, managing a database, connected to the digital compound machine via a network, the digital compound machine including:

an input screen generation unit configured to generate an input screen based on input screen configuration information received from the server beforehand; and an image data information sending unit configured to send, to an image data storing apparatus storing the image data, the image data, image data information and a DB key value, wherein the image data information is for associating the image data with the input screen configuration information and is input from the input screen generated by the input screen generation unit, and wherein the DB key value is for associating the database with the input screen configuration information.

According to the present invention, a digital compound machine that enables users to easily input documents for storing them in an electronic form in the image data obtaining system by cooperating with an operation system can be provided.

The digital compound machine may include a user authentication unit configured to authenticate a user.

The digital compound machine may further includes:

a time authentication data sending unit configured to send information on the image data to a time authentication server, connecting to the network, for authenticating a time;

a time certification data receiving unit configured to receive a time certification data for the information on the image data from the time authentication server; and an authenticated image data sending unit configured to send the time certification data received from the time authentication server to the image data storing apparatus associating the time certification data with the image data. The image data storing apparatus may be any storing unit that stores image data information or image data. The image data storing apparatus may be an intra-company operation system or an image data information storing unit.

The object can be also achieved by a system management server for receiving image data optically read by a digital compound machine via a network and storing the image data in a database, including:

a system information sending part configured to sending, to the digital compound machine, input screen configuration information and a DB key value, wherein the input screen configuration information is used for configuring an input screen displayed on the digital compound machine, and wherein the DB key value is for associating the database with the input screen configuration information;

an image data information receiving unit configured to receive the image data and image data information, wherein the image data information is for associating the image data input from the input screen with the input screen configuration information; and a DB storing unit configured to store the image data and/or image data information received by the image data information receiving unit in the database associating the image data and/or image data information with the DB key value.

According to the present invention, a system management server that enables users to easily input documents for storing them in an electronic form from a digital compound machine can be provided.

BRIEF DESCRIPTION OF THE DRAWINGS

Other objects, features and advantages of the present invention will become more apparent from the following detailed description when read in conjunction with the accompanying drawings, in which:

FIG. 10 is a flowchart showing processes for inputting a document from the MFP by performing time authentication;

FIG. 11 shows an example of an image information data file;

FIG. 12 shows an example of a button information selector file;

FIG. 13 shows an example of a selector information file;

FIG. 14 shows an example of an image data information file;

FIG. 15 shows an example of a screen information data file;

FIG. 17 shows an example of a process item screen;

DETAILED DESCRIPTION OF THE PREFERRED EMBODIMENTS

Figure 1:
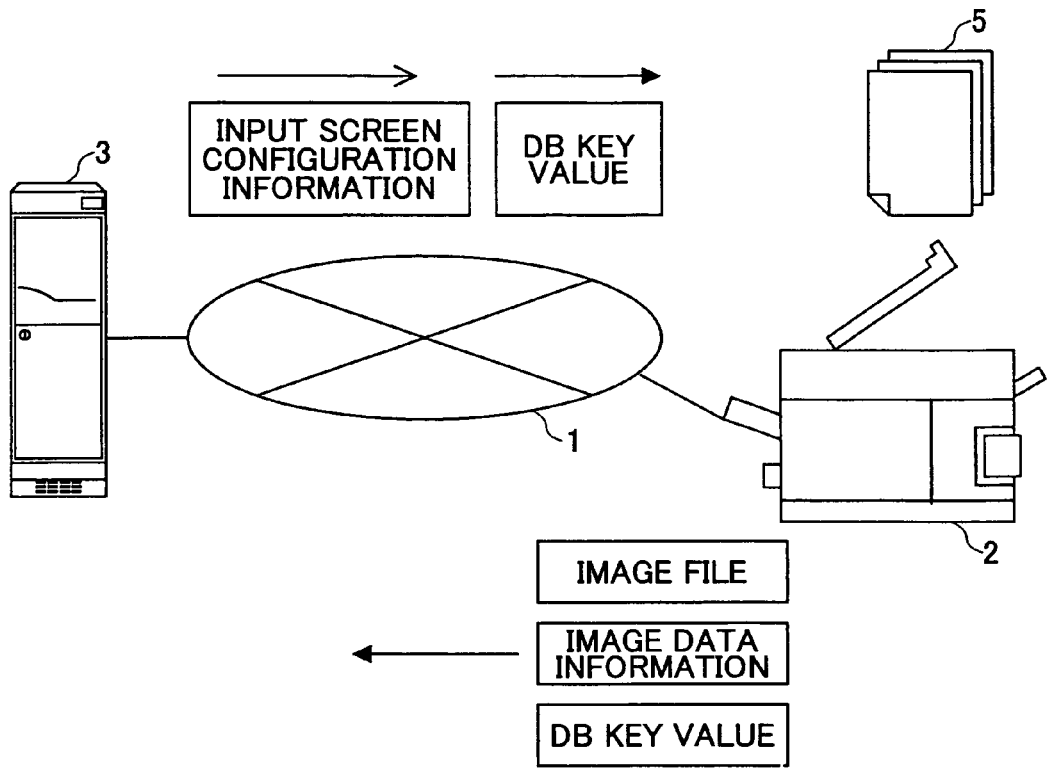
FIG. 1 is a block diagram showing the whole of an image data obtaining system.

In the following, preferred embodiments of the present invention are described with reference to figures. FIG. 1 is a block diagram showing the whole of an image data obtaining system of the present embodiment. In the image data obtaining system of the present embodiment, an digital compound machine 2 (to be referred to as MFP (Multi Function Printer) hereinafter) is connected to an intra-company operation system 3 via a network 1.

The MFP 2 includes a scanning unit similar to one of a copy machine and the like. Thus, the MFP 2 optically scans a document 5 so as to generate image data. In addition, the MFP 2 includes a communication unit so as to communicate with the intra-company operation system 3 via the network 1. The document 5 is a written contract, a floor plan and the like, for example.

When scanning a document, a predetermined input screen is displayed on a display apparatus of the MFP 2. The input screen is generated based on input screen configuration information. The input screen configuration information is sent to the MFP 2 with database key values (to be referred to as DB key values hereinafter) for specifying each piece of data in databases used in basic operations in the intra-company operation system 3. The intra-company operation system 3 sends the input screen configuration information to the MFP 2 beforehand according to the type of the document 5, for example. The MFP 2 dynamically generates an input screen using received items.

When a contract date, a room number, and a property name and the like are input by the user through the input screen, the document 5 is scanned by the MFP 2 so that the image data (to be referred to as an image file hereinafter) is generated.

In addition, based on information input from the input screen, image data information of the document 5 is generated. The image data information has a format including the DB key values, and the image data information is generated as a general-purpose file format such as text, CSV, XML and the like. The generated image data information is stored in a predetermined storing destination with the image file. The intra-company operation system 3 imports the image file and the image data information. The intra-company operation system 3 ascertains that the image data information and the image file should be stored in a database by associating them with particular data by referring to the DB key value.

Therefore, by utilizing the general-purpose machine that is the MFP, it is not necessary to input the document 5 itself and the image data information into the intra-company operation system 3 by referring to the document 5 when the user returns to the office. The user can input the information of the document 5 into the intra-company operation system 3 by easy operation.

A program is installed in the MFP 2 so as to realize the image data obtaining system with the intra-company business system 3. The program realizes an after-mentioned input screen generation unit, an image data information sending unit, and a personal authentication unit and the like.

The intra-company operation system 3 includes intra-company systems such as a sales management unit, an inventory control unit, a customer management unit, a personnel management unit, a production management unit and a drawing management unit and the like. The intra-company operation system 3 may be one computer and may be configured by a plurality of computers.

The intra-company operation system 3 can be realized by adding functions of the image data obtaining system to an existing intra-company system. For example, the intra-company operation system 3 includes a system information sending unit, an image data information receiving unit, a DB storing unit and the like that are described later. These units cooperate with the MFP 2 so that the image data obtaining system is realized.

Figure 2:
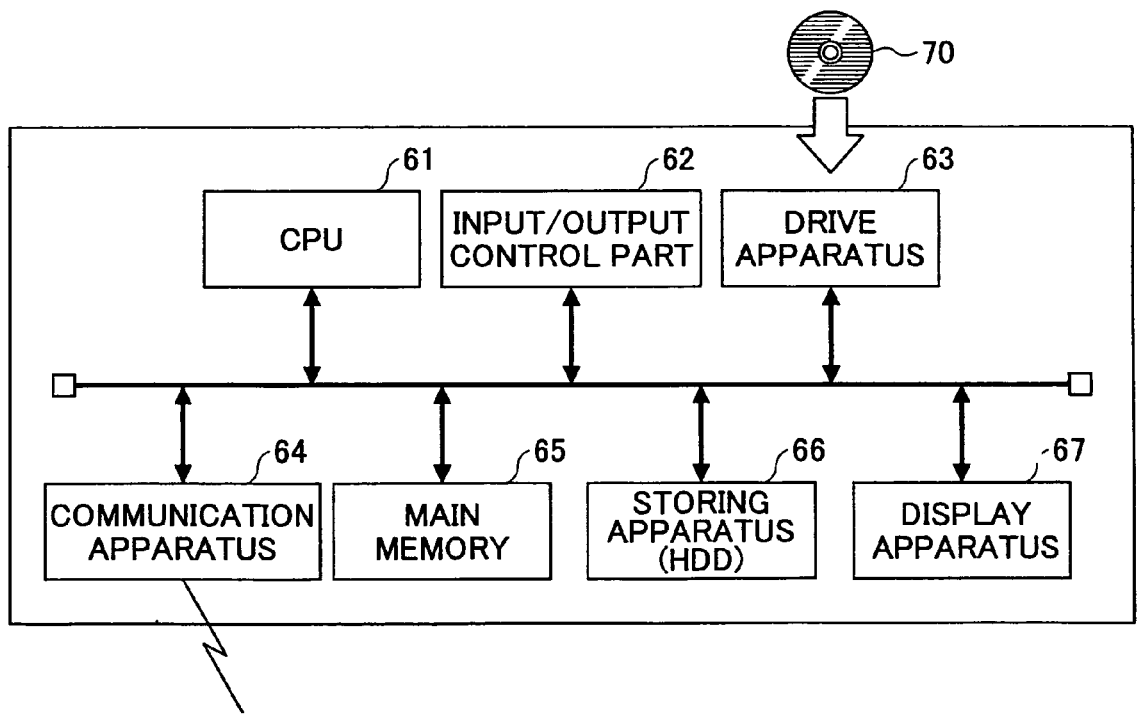
FIG. 2 is a hardware block diagram of a server for realizing the intra-company operation system.

FIG. 2 is a hardware block diagram of a server for realizing the intra-company operation system 3. As shown in FIG. 2, the server includes a CPU 61, an input/output apparatus 62, a drive apparatus 63, a communication apparatus 64, a main memory 65, a storage 66 and a display apparatus which are connected to a bus.

The CPU 61 collectively controls processes performed by the computer. The input/output apparatus 62 includes a keyboard or a mouse, and used for inputting various operation instructions from the user. The communication apparatus 64 is an interface used for connecting to a network such as the Internet and a LAN, and includes a modem, router or the like. The main memory 65 is a memory area for temporarily storing the operating system, programs and data. In the storage 66, a program for realizing the image data obtaining system is installed. A recording medium 70 such as a DVD-ROM or a CD-ROM can be inserted into the drive apparatus 63 so that the drive apparatus 63 can read a program or data from the recording medium 70 or write a program or data into the recording medium 70. The display apparatus 67 generates a GUI (Graphical User Interface) so as to display various windows, data and the like necessary for operation.

The program for realizing the image data obtaining system is provided by the recording medium 70 such as the DVD-ROM, for example. The recording medium 70 storing the program for realizing the image data obtaining system is set on the drive apparatus 63 so that the program is installed into the storage 66. The program may be downloaded via a network.

Communication between the intra-company operation system 3 and the MFP 2 is performed by FTP (File Transfer Protocol), SMB (Server Message Block) protocol, HTTP and the like, for example. For enhancing the security, it is preferable to encrypt the communication using SSL (Secure Socket Layers). The MFP may include an encryption function for encrypting the image file.

First Embodiment

Figure 3:
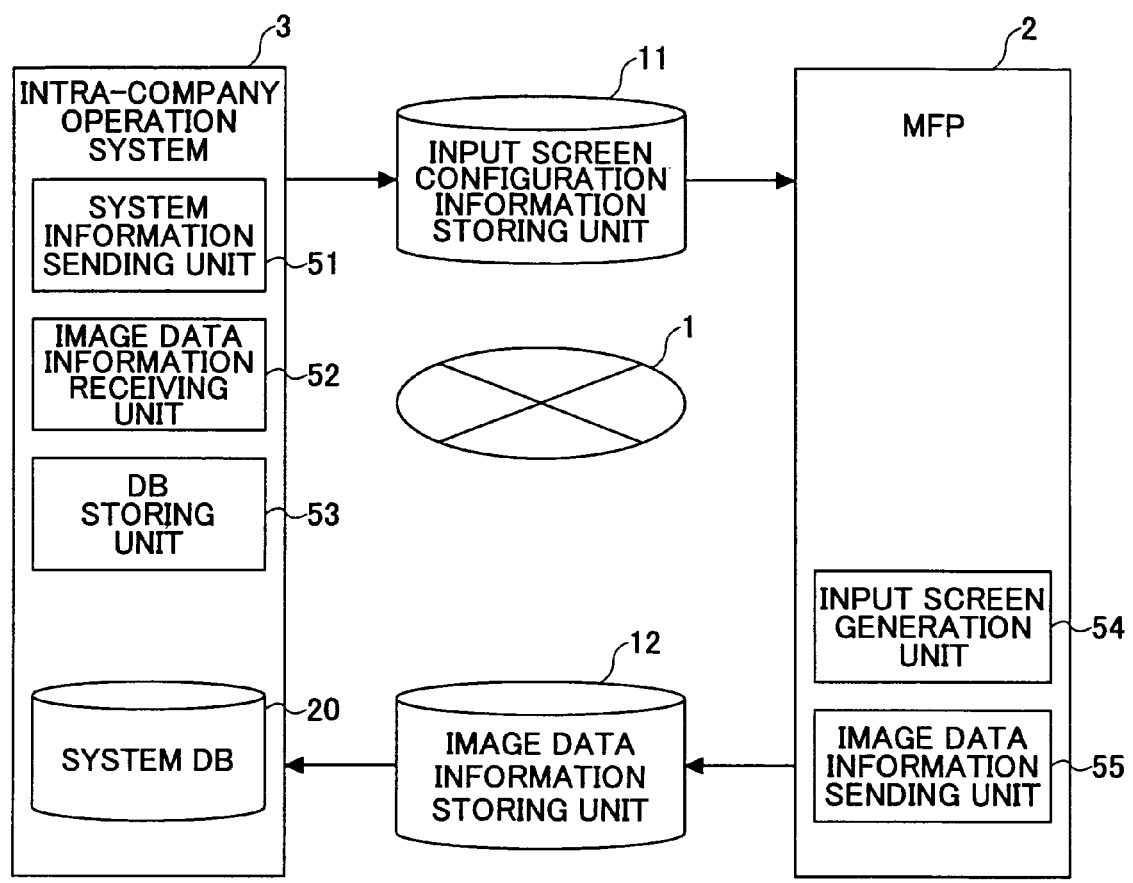
FIG. 3 shows an example of a system configuration of the image data obtaining system.

Next, a system configuration of the image data obtaining system is described. FIG. 3 shows an example of the system configuration of the image data obtaining system. In the system configuration shown in FIG. 3, the intra-company operation system 3 and the MFP 2 perform data transmit/receive via a network 1.

The intra-company operation system 3 is a system for performing intra-company operations such as sales management, financial management and customer management. The intra-company operation system 3 includes following units for cooperation between the intra-company operation system 3 and the MFP 2: a system information sending unit 51, an image data information receiving unit 52 and a DB storing unit 53. The system information sending unit 51 sends, to the MFP 2, input screen configuration information and DB key values necessary for configuring a screen to be displayed on the MFP 2. The image data information receiving unit 52 obtains image data information that is sent to the image data information storing unit from the MFP 2. The DB storing part 53 stores the information obtained by the image data information receiving unit 52 in a database in the intra-company operation system 3. A system DB 20 is a database used for basic business operations by the intra-company operation system 3.

The MFP 2 includes an input screen generation unit 54 and an image data information sending unit 55. The input screen generation unit 54 displays a screen to the display apparatus using the input screen configuration information received from the intra-company operation system 3. The image data information sending unit 55 sends image data information for specifying a document to be scanned to the intra-company operation system 3, wherein the image data information is input from a screen displayed by the input screen generation unit 54.

In addition, an input screen configuration information storing unit 11 and an image data information storing unit 12 are connected to the network 1. The input screen configuration information storing unit 11 and the image data information storing unit 12 may be included in the intra-company operation system 3.

The input screen configuration information storing unit 11 is a storing unit for storing the input screen configuration information with the DB key value as a file. The input screen configuration information storing unit 11 is generally provided as a file server. The image data information storing unit 12 is a storing unit for outputting an image file and image data information with the DB key value, wherein the image file is generated by scanning a document by the MFP 2. The image data information storing unit 12 is also provided as a file server.

Each of the input screen configuration information storing unit 11 and the image data information storing unit 12 is a storing unit for storing so-called intermediate files. By providing the storing units, process workload of the intra-company operation system 3 is decreased, so that input screen configuration information can be held as a format applicable for displaying on the MFP 2. Alternatively, the intra-company operation system 3 and the MFP 2 directly send and receive files without using the intermediate file.

Next, a file of the input screen configuration information in the input screen configuration storing unit 11 is described. The input screen configuration storing unit 11 stores files shown in FIGS. 11-13. FIG. 11 shows an image information data file. The image information data file includes information for generating after-mentioned main screen and process item screen. The information specifies "input type" in each display field of the screen and specifies each selection method (selector information) when the input type is "selector". The image information data file is generated from the system DB 20. In addition, the image information data file includes the DB key value for ensuring uniqueness of each piece of data in the database in the system DB 20. For example, the DB key values are "name of construction" and "number of construction" shown in FIG. 11.

FIG. 12 shows a button information selector file. The button information selector file includes information for generating a screen when one of after-mentioned construction name selectors is pushed.

FIG. 13 shows a selector information file. The selector information file defines items to be displayed according to a pushed button when an after-mentioned selector screen is displayed. Details of the image information data file, the button information file and the selector information file are described later.

Figure 4:
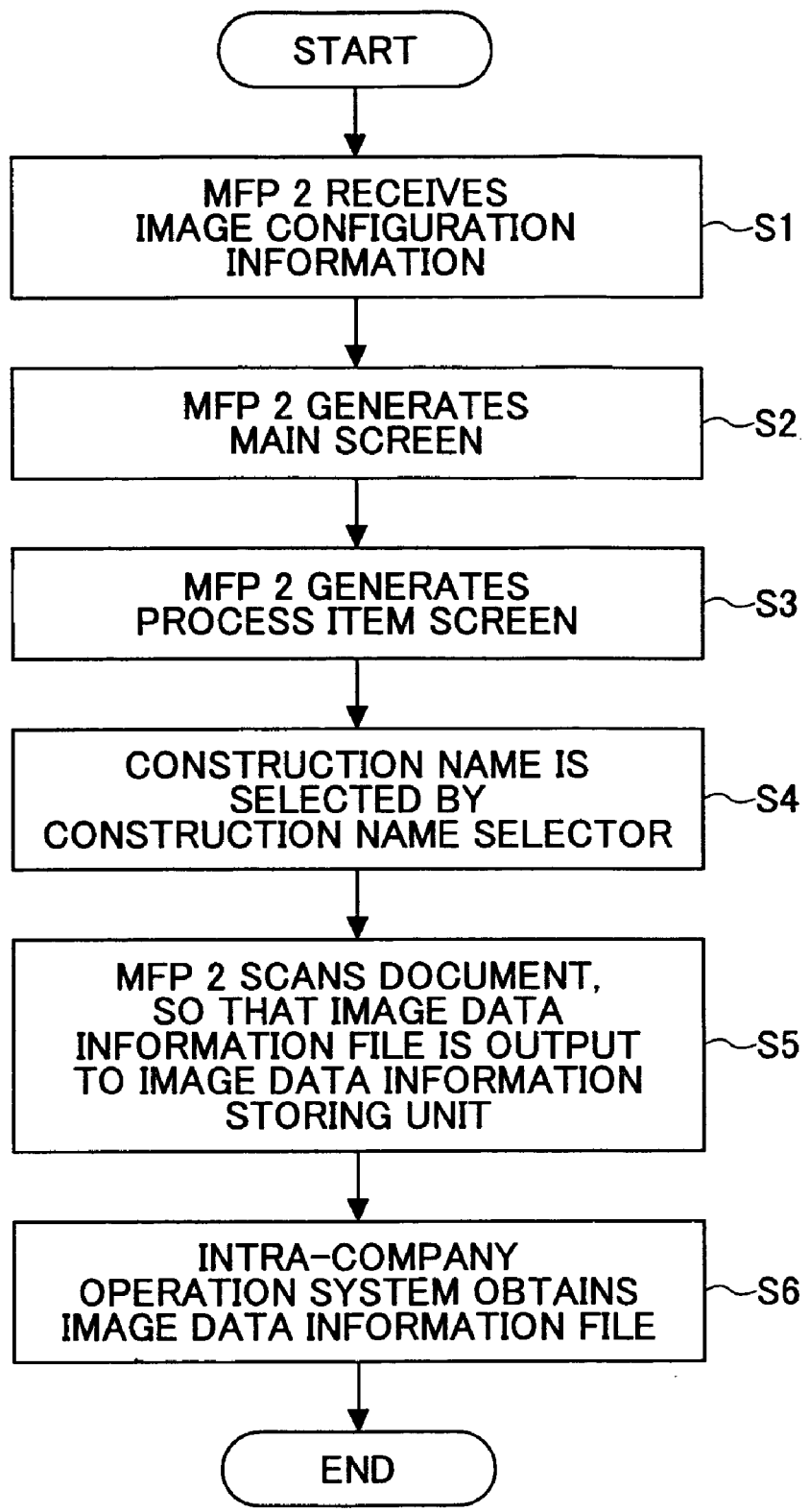
FIG. 4 is a flowchart showing processes for inputting a document from the MFP.

Next, operations of the system shown in FIG. 3 for inputting a document from the MFP 2 are described. FIG. 4 shows a flowchart showing the processes for inputting the document from the MFP 2.

(Step S1)

For example, when the user selects a document input mode from a touch panel and the like of the MFP 2, the process of the image data obtaining system starts. The document input mode is an operation mode for inputting a document to the intra-company operation system 3. The document input mode can be selected separately from normal modes such as a copy mode.

First, the MFP 2 generates an input screen based on the input screen configuration information sent from the intra-company operation system 3 by the system information sending unit 51. It is preferable the MFP 2 receives the input screen configuration information beforehand. The input screen configuration information may be received after power-on of the MFP 2, or may be received each time when the document input mode is selected. In addition, when the input screen configuration information is updated, the MFP 2 may receive the updated input screen configuration information.

(Step S2)

Figure 16:
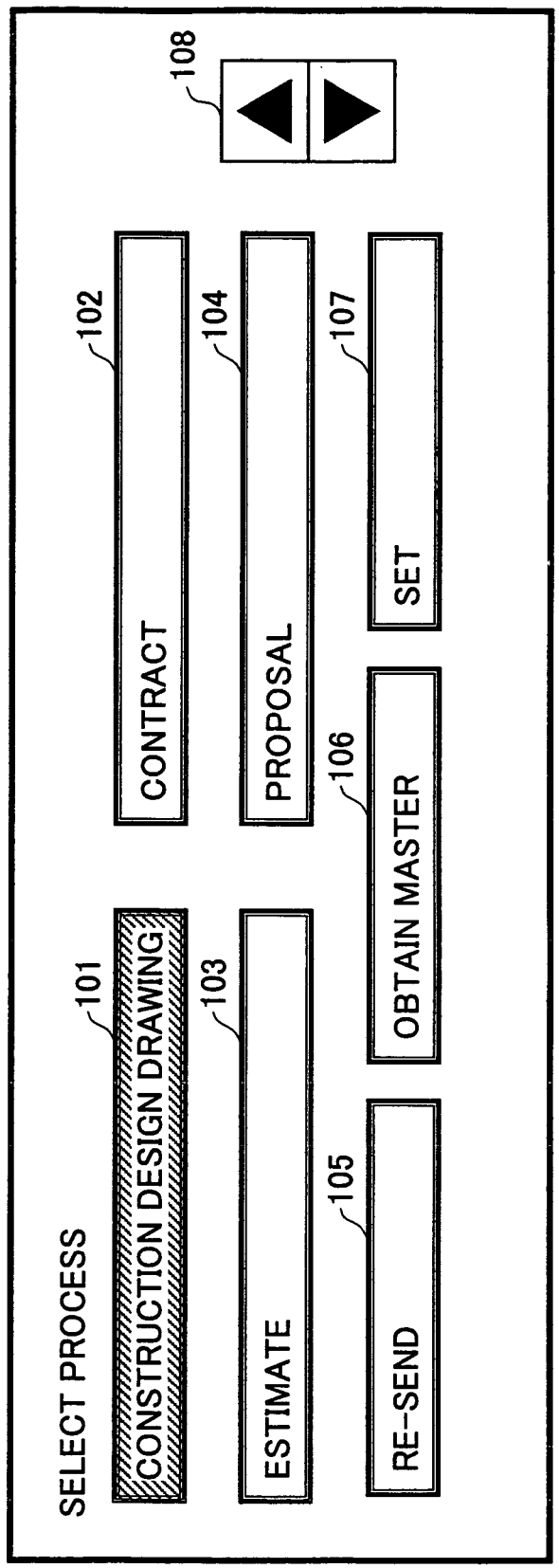
FIG. 16 shows an example of a main screen.

The MFP 2 that receives the input screen configuration information generates a main screen based on the screen information data file shown in FIG. 11 so as to display the main screen on the display apparatus. FIG. 16 shows an example of the main screen. The main screen includes buttons for selecting executable processes and buttons for setting operations. The buttons for selecting executable processes include a construction design drawing button 101, a contract button 102, an estimate button 103, and a proposal button 104. The buttons for setting operations include a retransmission button 105, a master obtaining button 106 and a setting button 107. On the buttons for selecting the executable processes, items in the first column "processes name" in FIG. 11 are displayed respectively. When all of the buttons cannot be displayed on the screen, the user can scroll the screen by using the scroll button 108.

The button for selecting the executable process is dynamically generated according to information in the image information data file. In addition, the button for setting operations is not changed irrespective of information in the image information data file. The image information data file is generated using XML (extensible Markup Language), for example. By using XML, the image information data file can be dynamically generated using the browser function of the MFP 2.

By generating information to be displayed on the screen based on information read from the screen information data file instead of fixedly generating the information to be displayed beforehand, various screen information data files can be displayed flexibly on the screen. In this embodiment, it is assumed that the construction design drawing button 101 is pushed.

(Step S3)

When the user pushes a button so that a process is selected, a process item screen shown in FIG. 17 is generated based on the screen information data file. The process item screen includes a display field 109 of a creation date, a display field 111 of a code of person in charge, a display field 116 of a construction name, a display field 117 of a construction number, a display field 118 of notes, change buttons 110, 112 and 119 for creation date, code of person in charge and notes, and selection buttons 113-115 for construction name selectors. The Back button 120 is a button to go back to a previous screen, and the OK button 121 is a button to go to a next screen.

Each display field displays an item stored in the second column "input item" in the screen information data file in FIG. 11. In the display field 109 of the creation date, an input date is input using a ten key and the like. The MFP may automatically input the input date. In the display field 111 of the code of person in charge, an identifier for identifying a person in charge is input by using a ten key and the like. Uniqueness is ensured for the code of person in charge in the image data obtaining system. An authentication process may be performed for the code of person in charge when starting to use the MFP 2, so that a code of an authenticated user may be automatically displayed.

The selection button 113 of the construction name selector enables the user to perform "AIUEO" selection. The selection button 114 enables the user to perform area name selection, and the selection button 115 enables the user to perform branch name selection. The construction name can be selected by any one of the methods. In each item of the display field 116 of the construction name, the display field 117 of the construction number and the display field 118 of notes, information selected by the selection button 113, 114 or 115 of the construction name selector is displayed. The information of the construction name and the like can be identified by the DB key value not shown in the figure.

(Step S4)

Figure 18:
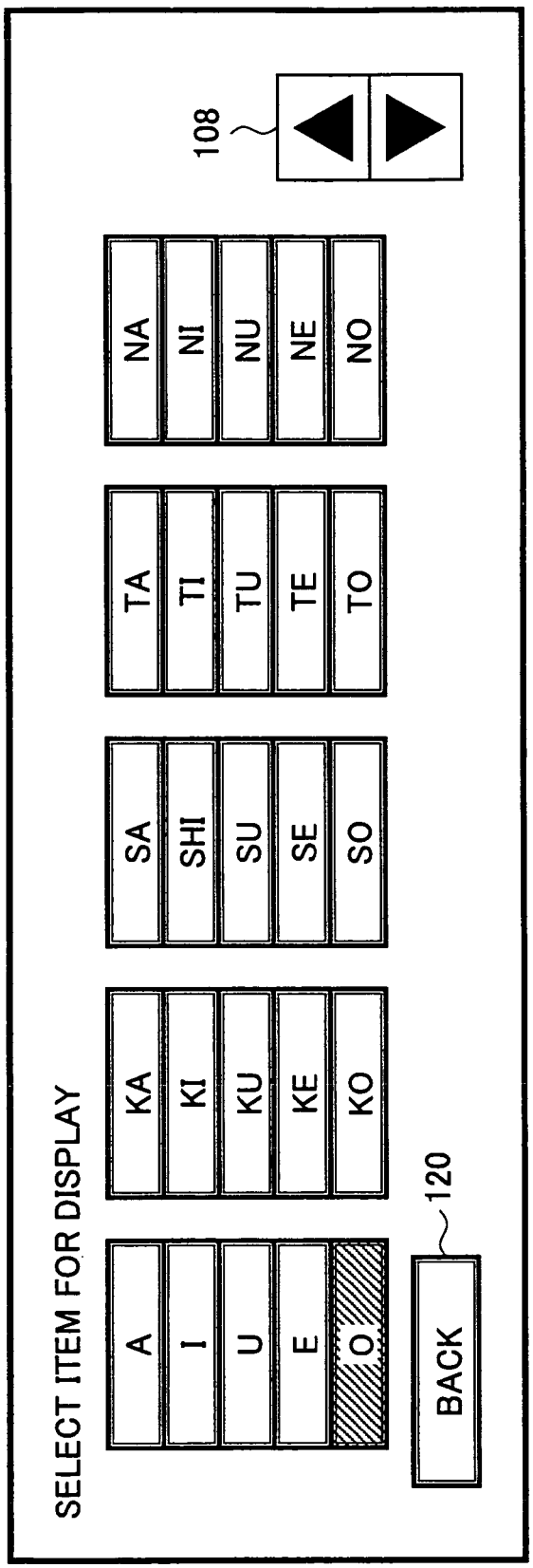
FIG. 18 shows an example of an aiueo selector screen.

When the AIUEO selection is selected by pushing the selection button 113 of the construction name selector, an AIUEO selector screen is displayed as shown in FIG. 18. On the AIUEO selector screen, a construction name is designated from the Japanese syllabary. The user can input a construction name by pushing the kana in the Japanese syllabary shown in FIG. 18. The screen shown in FIG. 18 is generated using information in fields classified by "aiueo" in the button information file shown in FIG. 12 stored in the input screen configuration information storing unit 11. That is, configuration elements of the screen are defined in the button information file beforehand, so that the MFP 2 generates the screen according to the information. Accordingly, complicated processes including conditional determination can be performed in the PC side so that the process in the MFP 2 with limited process capability (memory, and CPU) can be reduced.

Figure 19:
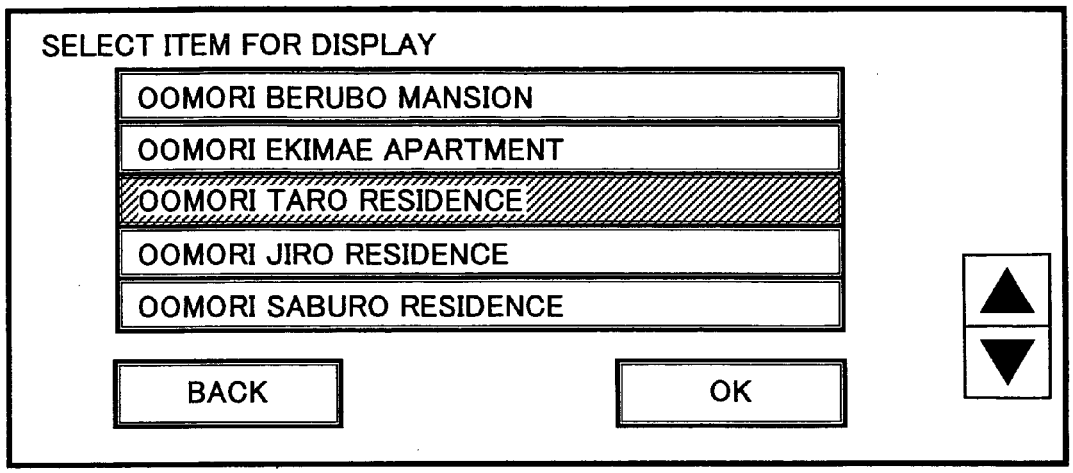
FIG. 19 shows an example of a construction name selection screen.

When the user pushes a key corresponding to a first kana character of a construction name that the user wants to input, item names beginning with the specified kana are extracted. The extracted item names are displayed as a list (construction name selection screen) of construction names, so that the user can select a construction name from the list. The construction name selection screen shown in FIG. 19 is generated by using information classified as "AIUEO" in the selector information file shown in FIG. 13 stored in the input screen configuration information storing unit 11. FIG. 19 shows an example in which "O" is pushed in the AIUEO selector screen shown in FIG. 18. Since "O" is pushed, construction names whose first character is "O" are displayed.

Figure 20:
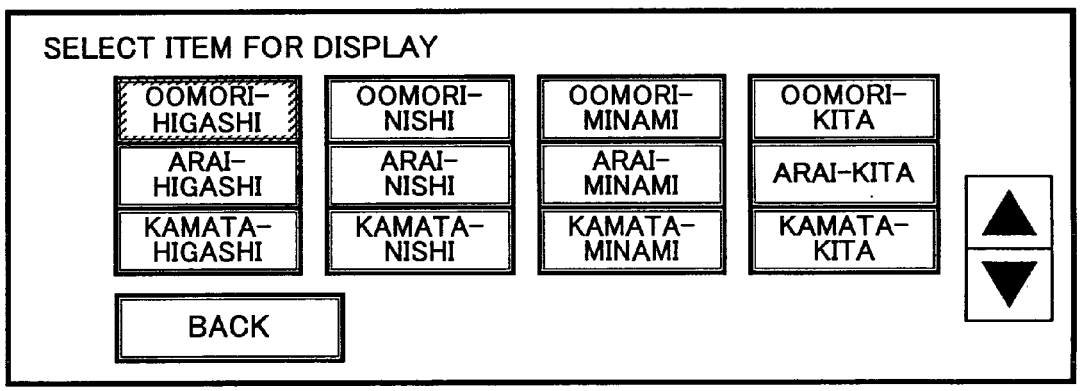
FIG. 20 shows an example of an area name selector screen.

When area name selection is selected by pushing the selection button 114 of the construction name selector shown in FIG. 17, an area name selector screen is shown as shown in FIG. 20. On the area name selector screen, a construction name can be designated from an area name. The area name selector screen shown in FIG. 20 is generated using information classified as "area" in the button information file shown in FIG. 12 stored in the input screen configuration information storing unit.

Figure 21:
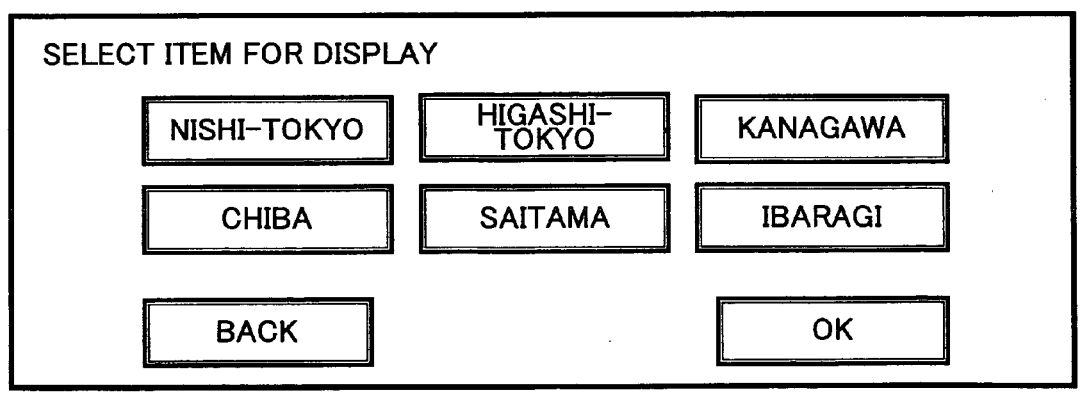
FIG. 21 shows an example of a branch name selector screen.

When branch name selection is selected by pushing the selection button 115 of the construction name selector shown in FIG. 17, a branch name selector screen is shown as shown in FIG. 21. On the branch name selector screen, a construction name can be designated from a branch name. The branch name selector screen shown in FIG. 21 is generated using information classified as "branch" in the button information file shown in FIG. 12 stored in the input screen configuration information storing part.

When a construction name is selected, the process item screen shown in FIG. 17 is displayed again. As mentioned above, a selected construction name is displayed on the display field 116 of the construction name. Information input in step S4 becomes image data information.

(Step S5)

The MFP 2 scans a document. The MFP 2 generates image data of the document as an image file so as to send the file to the image data information storing unit 12. It is preferable to use industry-standard formats as the file such as TIFF, PDF and the like. Accordingly, data read from the file can be widely used.

In addition, an image data information file (including DB key value) is output to the image data information storing unit 12, wherein the image data information file includes image data information input from the display apparatus of the MFP 2 and a storing destination of the image file.

FIG. 14 shows an example of the image data information file. The image data information file shown in FIG. 14 includes fields of process date, execution process name, selector, input button, file path, creation date, code of person in charge, construction name, DB key value, and notes. The image data information input in the step S4 are stored in the fields. In addition, a stored location of the image file is stored in the "file path" as a file path format. The DB key value is a key for associating the information with a database included in the intra-company operation system 3. By using the DB key value, "Oomori Taro's residence" can be specified as a construction name, so that the system DB 20 included in the intra-company system 3 can cooperate with a database on construction of the "Oomori Taro's residence". That is, when referring to a construction design drawing of the construction of the Oomori Taro's residence, the intra-company operation system 3 can refer to the image file of the file path by designating the DB key value "1043".

(Step S6)

The intra-company operation system 3 monitors the image data information storing unit 12 so as to detect that the image data information file is sent. The intra-company operation system 3 obtains the image data information file shown in FIG. 14. At this time, the intra-company operation system 3 stores information indicating the location where the image file is stored at the same time. Next, the intra-company operation system 3 deletes the obtained image data information file from the image data information storing unit 12. By deleting it, it becomes unnecessary to determine whether referring data is one that has already been processed or not, so that the intra-company operation system 3 needs only to detect presence or absence of a file (image data information file in this case) to be processed. Accordingly, the process shown in the flowchart in FIG. 4 ends.

Information obtained in the intra-company operation system 3 can be used as business operation activity data such as data reference by the function of the intra-company operation system 3. In addition, the intra-company operation system 3 can use the image file based on storing location information of the image file included in the image data information file. For example, the image file can be displayed on a screen of a desired PC using a dedicated viewer.

Second Embodiment

In the second embodiment, an image data obtaining system including a document management system is described. FIG.

Figure 5:
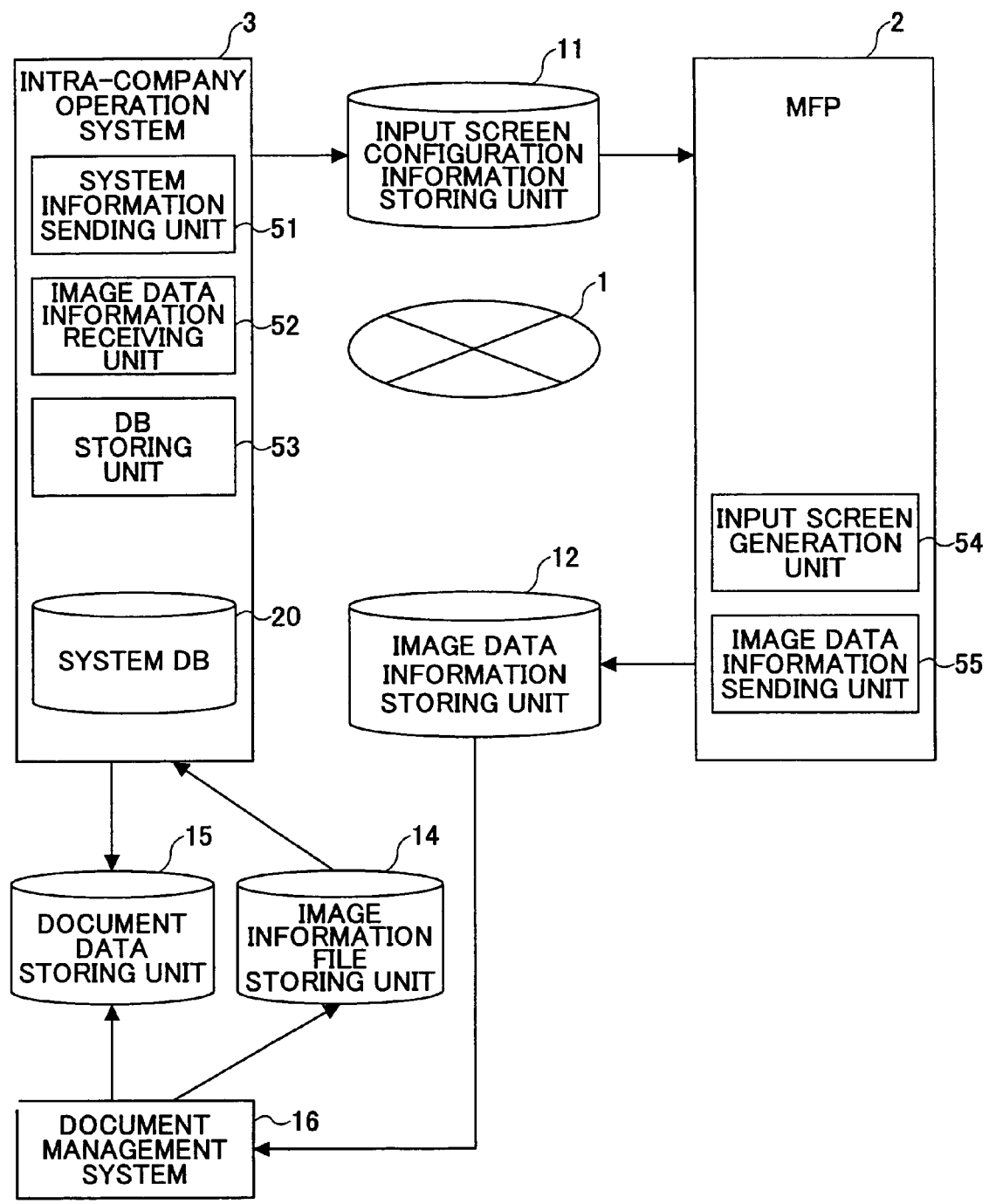
FIG. 5 shows an example of a system configuration of the image data obtaining system of a second embodiment.

5 shows an example of a system configuration of the image data obtaining system of the second embodiment. The image obtaining system shown in FIG. 5 is different from the system shown in the first embodiment in that the image obtaining system shown in FIG. 5 cooperates with a document management system. In FIG. 5, the same reference numerals are used to identify corresponding features in FIG. 3.

In the image data obtaining system shown in FIG. 5, an image data information file is output to the image data information storing unit 12 from the MFP 2. Then, the document management system 16 obtains an image file and image data information output to the image data information storing unit 12. After that, the document management system 16 sends the image data information to an image information file storing unit 14, and sends the image file to a document data storing unit 15.

The document management system 16 provides various functions for performing management of documents. For example, the document management system 16 manages document files (data files such as word processing files and spreadsheet files, and image files and the like) by adding attributes, and the document management system 16 includes an original search function.

The image information file storing unit 14 is a storing unit for storing image data information that is a file to be obtained by the intra-company operation system 3. The image information file storing unit 14 is provided as a file server, generally.

The document data storing unit 15 is a storing unit managed by the document management system 16, and manages scanned documents and image files of the scanned documents.

Figure 6:
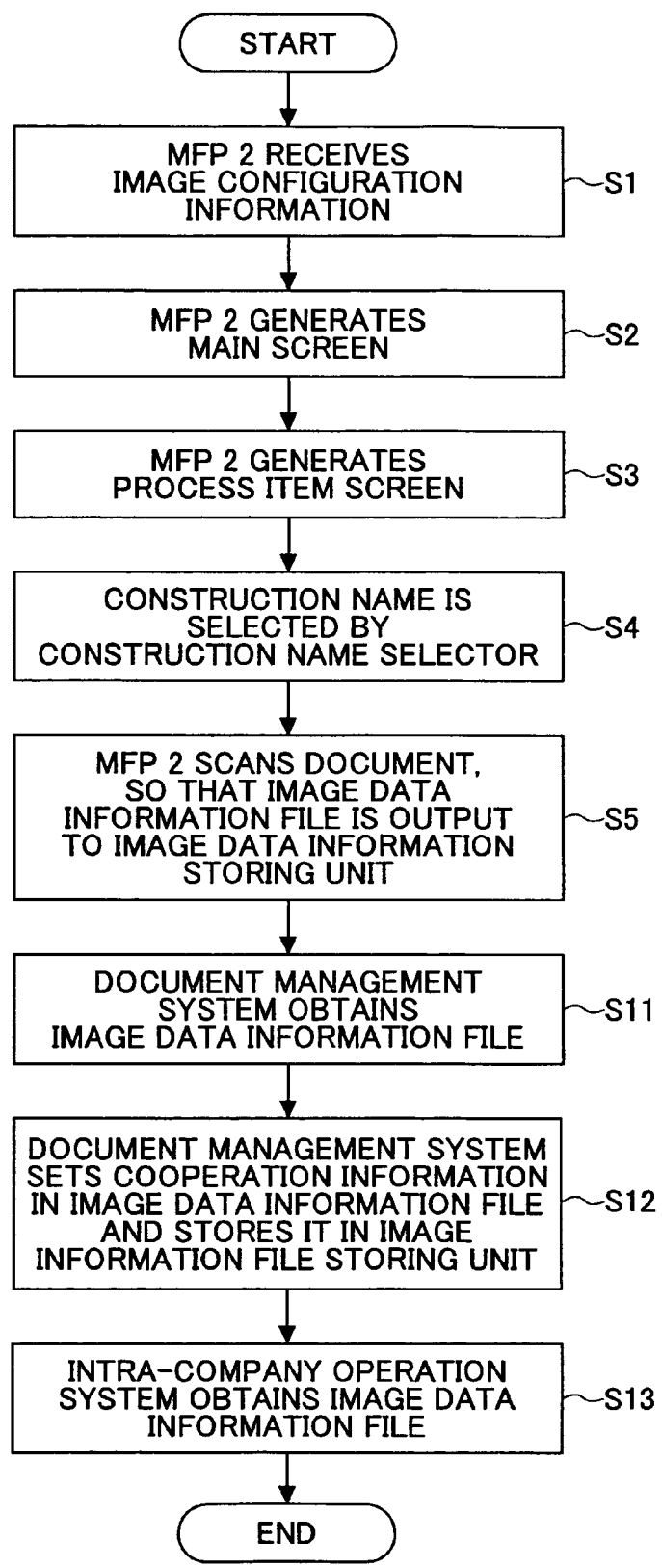
FIG. 6 is a flowchart showing processes for inputting a document from the MFP in the second embodiment.

In the following, operations of the system shown in FIG. 5 for inputting a document from the MFP 2 to the intra-company operation system 3 is described. FIG. 6 shows a flowchart of the process for inputting a document from the MFP 2 to the intra-company operation system 3. Process from the start to outputting the image data information to the image data information storing unit 12 are the same as processes in the first embodiment. Therefore, steps S1-S5 are not described in this embodiment.

(Step S11)

The document management system 16 monitors the image data information storing unit 12. When the document management system 16 detects that an image file and an image data information file that are output by the MFP 2 are stored in the image data information storing unit 12, the document management system 16 obtains the image data information file and the like.

(Step S12)

The document management system 16 sets cooperation information in the obtained image data information file wherein the cooperation information is used for the intra-company operation system 3 to cooperate with the document management system 16. Then, the document management system 16 stores the image data information file in the image information file storing unit 14. In addition, the document management system 16 stores the image file in the document data storing unit 15. Since the image file can be managed by the document management system 16 when the image data information file is stored in the image information file storing unit 14, the image file is not stored in the image information file storing unit 14.

(Step S13)

The intra-company operation system 3 monitors the image information file storing unit 14. When the intra-company operation system 3 detects that the image data information file is placed in the image information file storing unit 14, the intra-company operation system 3 obtains the image data information file.

By physically separating the image data information storing unit 12 monitored by the document management system 16 from the image information file storing unit 14 monitored by the intra-company operation system 3, the intra-company operation system 3 only needs to pay attention to the image data information file irrespective of presence or absence of cooperation with the document management system 16.

The intra-company operation system 3 refers to information in the image data information file stored in the image information file storing unit 14 so as to obtain necessary information. Since the cooperation information to cooperate with the document management system 16 is set in the image data information file in step S12, the intra-company operation system 3 cooperates with the document management system 16 based on the cooperation information.

Next, the intra-company operation system 3 deletes the obtained image data information file from the image information file storing unit 14. Then, the processes shown in the flowchart of FIG. 6 end.

According to the present embodiment, by cooperating with the document management system 16 for managing the image file, file management in which the intra-company operation system 3 and the document management system 16 are integrated can be realized. In addition, a document can be extracted by using abundant search functions of the intra-company operation system 3.

Third Embodiment

Figure 7:
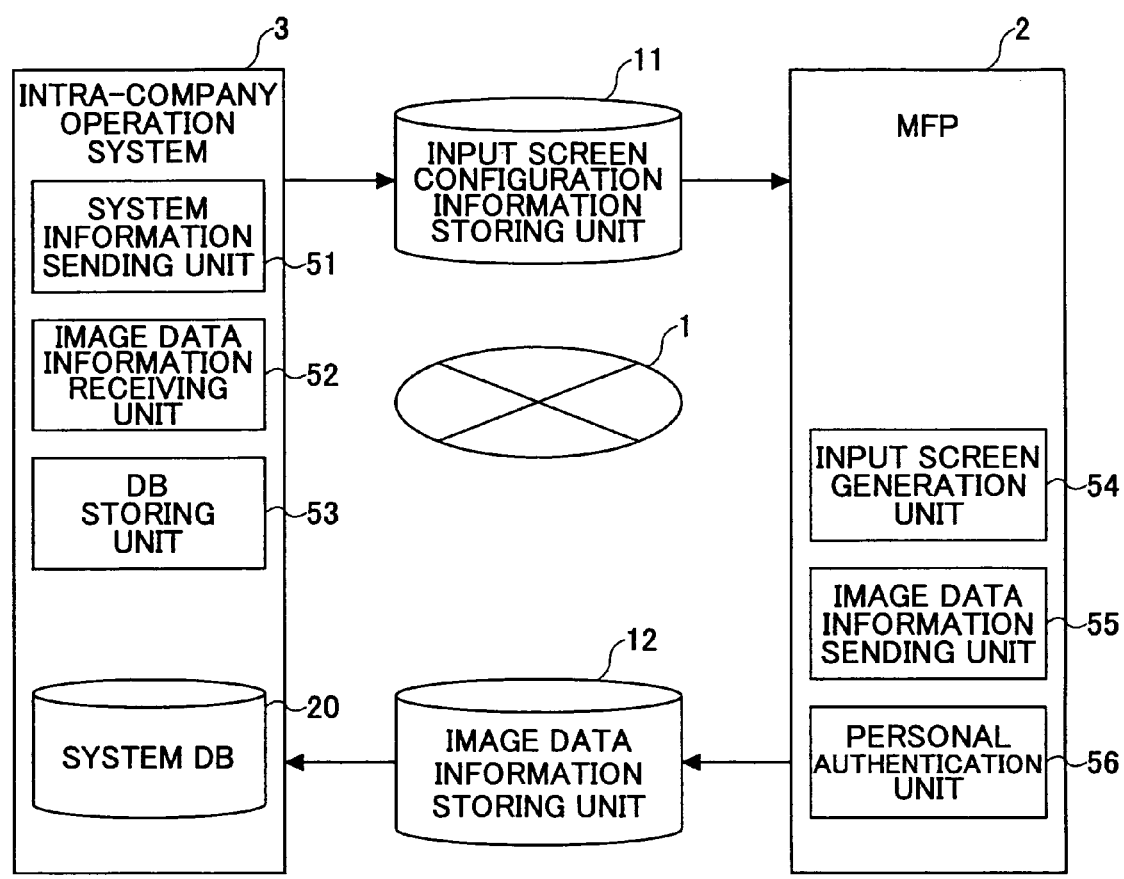
FIG. 7 shows an example of a system configuration of the image data obtaining system in a third embodiment.

In the third embodiment, an image data obtaining system that can perform personal authentication is described. FIG. 7 shows an example of a system configuration of the image data obtaining system. The image data obtaining system of FIG. 7 is different from the system of the first embodiment in that the MFP 2 includes a personal authentication unit. In FIG. 7, the same reference numerals are used to identify corresponding features in FIG. 3.

The personal authentication unit 56 authenticates the identity of a user based on combination of a user name and a password input by the user or based on personal data read from a card reader. The authentication may be performed based on living body information such as fingerprint, vein and iris and the like. The personal authentication unit 56 manages user information of users having use authority. The personal authentication unit 56 determines whether to permit the user to use the system by checking whether input data is the same as the user information.

Figure 8:
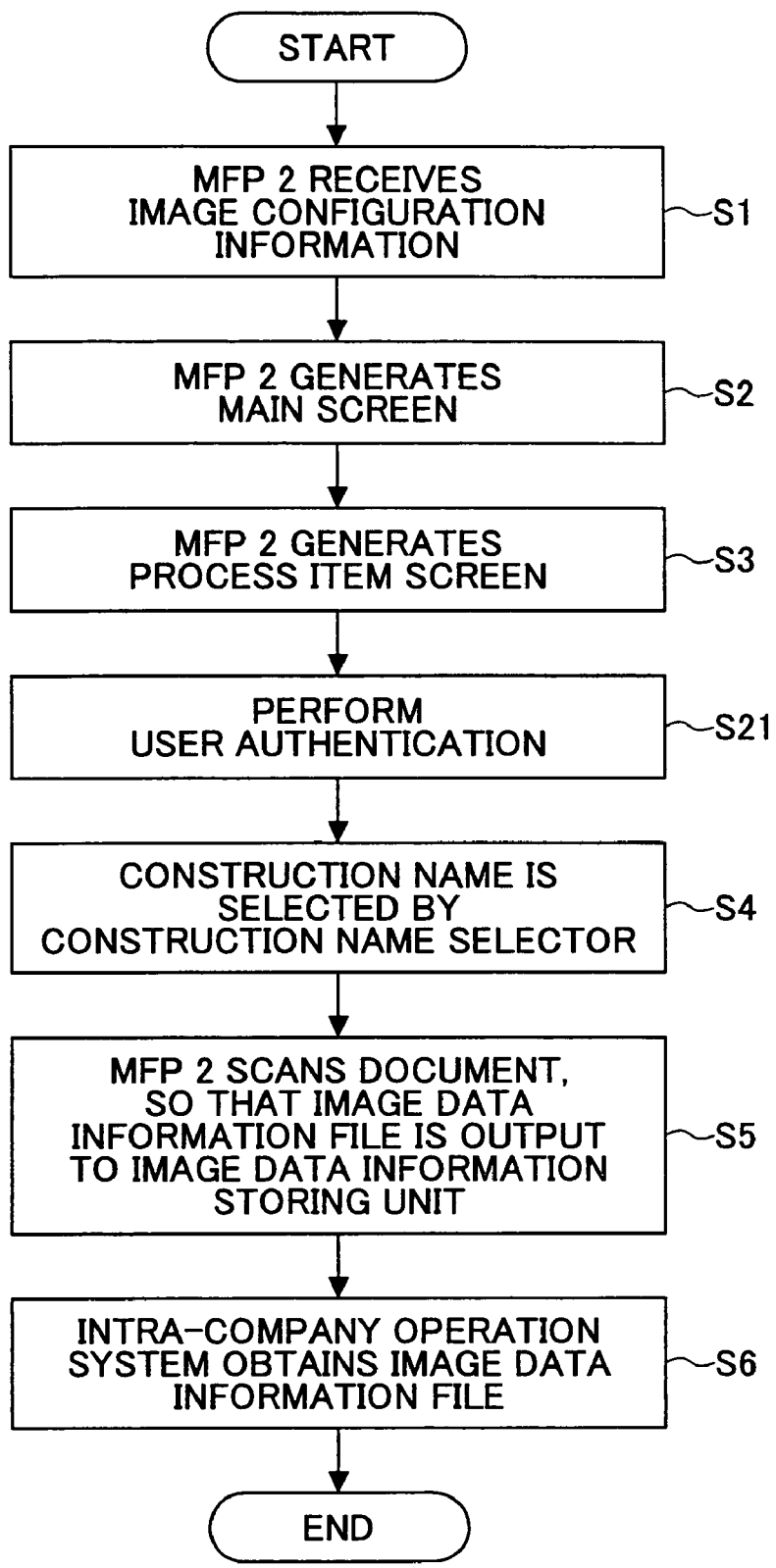
FIG. 8 is a flowchart showing processes for inputting a document from the MFP by performing user authentication.

FIG. 8 is a flowchart showing processes for inputting a document from the MFP 2 by performing user authentication. In FIG. 8, the same reference numerals are used to identify corresponding steps in FIG. 4.

(Step S21)

When generation of the process item screen starts in step S3, a user authentication process is performed. As mentioned above, the process item screen is configured by the image information data file of FIG. 15. The screen information data file includes fields of "input type" for specifying an input method. The screen information data file of FIG. 15 has a configuration the same as one in FIG. 11, but is different from one in FIG. 11 in that setting for requiring identity authentication can be made on the "input type" in this embodiment. FIG. 15 shows an example in which "input type" of a person in charge requires identity authentication.

When the "input type" is set so as to require identity authentication, a screen for performing identity authentication is displayed before the "process item screen" is displayed. For example, a message prompting a user for inserting an IC card into a card reader is displayed.

Information of the user read from the IC card is authenticated on the spot. When it is verified that the user is a person validly permitted to use the system, the screen changes to the original operation screen (to the process item screen in this case). On the display field 111 of the code of person in charge on the process item screen, a code of the user read from the IC card is displayed. Instead of the code, the user name may be displayed. Processes after that are the same as those in the first embodiment.

The process item screen may be displayed before performing personal authentication. In this case, the personal authentication may be performed when an item defined to require identity authentication in the "input type" is selected. Accordingly, as for the screen information data file in FIG. 15, the screen of the personal authentication is displayed only after the user inputs the code of the user. In addition, the personal authentication may be performed before displaying the main screen.

According to the present embodiment, the personal authentication unit 56 is incorporated in the series of processes so that information for specifying a person obtained from the IC card and the like can be displayed on the screen, and the information can be added to the image data information. The personal authentication unit 56 may be an external system or may be realized by dedicated hardware or a computer with dedicated software. By incorporating the personal authentication, the user who performs scanning of a document can be identified so that the security can be improved.

Fourth Embodiment

Figure 9:
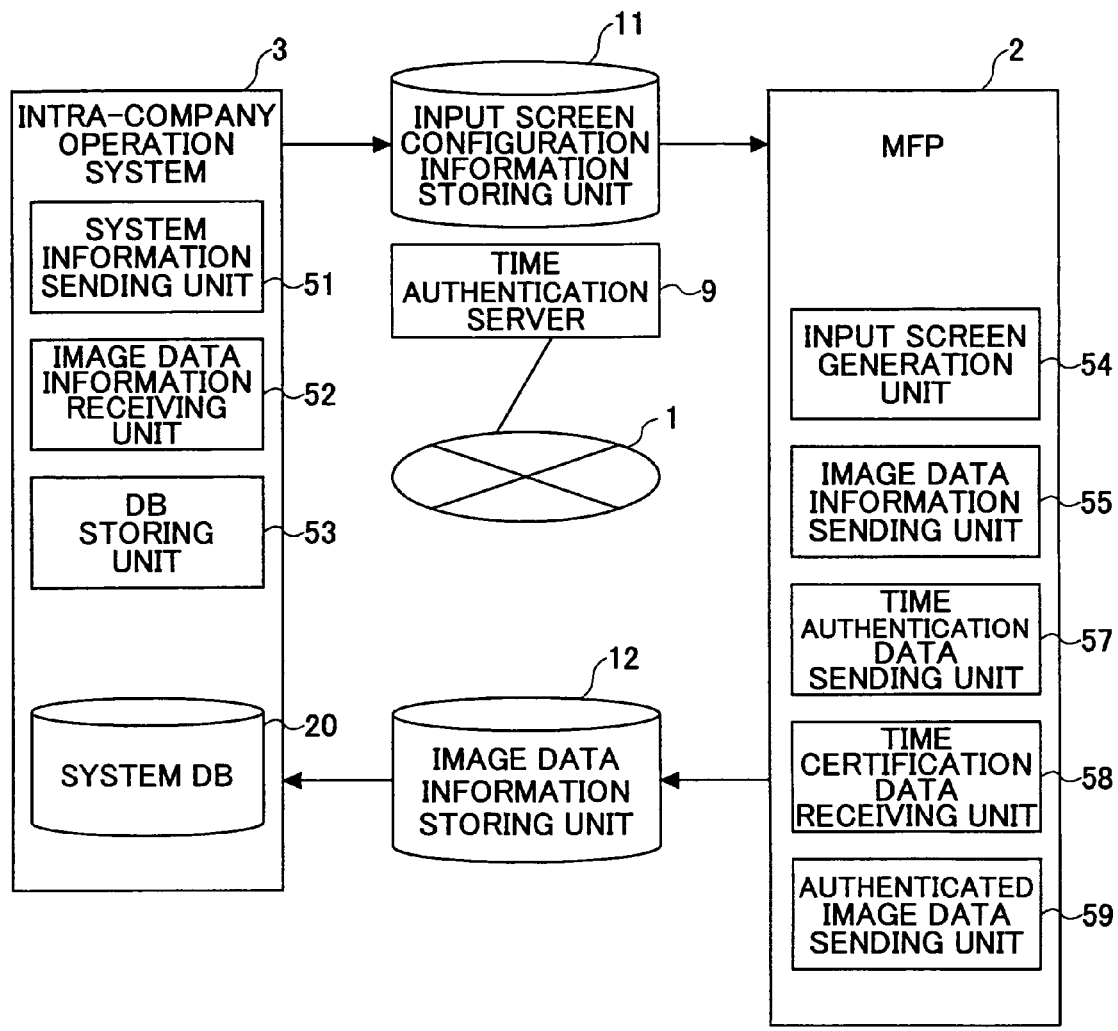
FIG. 9 shows an example of a system configuration of the image data obtaining system in a fourth system.

In the fourth embodiment, an image obtaining system that can provide time authentication to the image file is described. FIG. 9 shows an example of a system configuration of the image data obtaining system. The image data obtaining system of FIG. 9 is different from the system of the first embodiment in that the MFP 2 is connected to a time authentication server 9 via a network. The time authentication server 9 may be included in the image data obtaining system, or may be provided as an external system.

The MFP 2 in FIG. 9 includes a time authentication data sending unit 57, a time certification data receiving unit 58 and an authenticated image data sending unit 59. The time authentication data sending unit 57 sends information on image data to the time authentication server. The time certification data receiving unit 58 receives, from the time authentication server, time certification data generated by the time authentication server based on the information of the image data. The authenticated image data sending unit 59 sends the time certification data to an image data storing apparatus (intra-company operation system 3 or the image data information storing unit 12) by associating the time certification data with the image data. In FIG. 9, the same reference numerals are used to identify corresponding features in FIG. 3. In this embodiment, a hash value of an image file is used as information on the image data.

The time authentication serve 9 obtains time information at the time when receiving a request of the time authentication from the MFP 2 and generates time certification data for the hash value of the image file. The time authentication is to certify that a file which is the object for authentication exists at a specified time by obtaining a time stamp at the time from a publicly certified time authentication server. The time certification data is associated with the hash value of the image file specified at the time of the request, so that the time certification data cannot be tampered.

FIG. 10 shows a flowchart showing processes for inputting a document from the MFP 2 by performing time authentication. In FIG. 10, the same reference numerals are used to identify corresponding steps in FIG. 4.

(Step S31)

After input of necessary items from the process item screen in FIG. 17 ends, the document is scanned by the MFP 2. When the document is scanned, the MFP 2 connects to the time authentication server 9 automatically or based on user's instruction. The MFP 2 sends a hash value of the image file to the time authentication server 9.

(Step S32)

The time authentication server 9 generates time certification data for the hash value of the image file and sends the time certification data to the MFP 2. The MFP 2 attaches the received time certification data to the image data information and to the image file to store the data in the image data information storing unit 12. Processes performed after that are the same as those of the first embodiment.

According to the present embodiment, if the creation date and time of the read image file have importance, the time authentication can be incorporated. For example, obtained date and time can be specified for a document such as a receipt in which the issued date and time are important. Thus, management of documents can be performed more reliably.

As mentioned above, by positioning the MFP as an input terminal of the intra-company operation system 3, basic systems such as sales management, inventory control, accounting, personnel management and the like and image files of documents relating to the basic systems can be easily integrated. That is, after converting the document to the image file by the MFP, change of file name and data input for associating the image file with the basic system are not necessary.

In the document management system (for managing documents and image files) and the intra-company operation system that are separated and coexist in the conventional technology, by using the MFP as an input terminal, reliability and operability in the workflow from data input to search can be largely improved.

By using the MFP, a document can be input into the intra-company operation system from a simple operation screen by an operation like copying. Therefore, the operation is easy. In addition, document input operation by the user can be supported in the conventional support of the MFP, so that management of the system is easy. That is, the intra-company operation system can be provided irrespective of IT skill of the user.

In addition, since the MFP can be customized, an MFP that complies with a customer's intra-company operation system can be provided. For example, templates of input screens may be prepared for each category of business or for each business operation, so that the user can select the input screen.

When the MFP generates a display screen, a voucher number, a property name, a name of a person in charge and the like can be displayed from the intra-company operation system. Thus, the user can refer to data of the intra-company operation system from the outside of the company.

Although the system is described taking construction name, design drawing or the like as an example in the first to fourth embodiments, the present invention can be applied irrespective of the type of the document to be input. For example, the present invention can be applied to following cases, for example: inputting contracts, receiving inspection documents and the like in cooperation with an intra-company operation system of a building firm; inputting floor plans, maps, lease contracts and the like in cooperation with an intra-company operation system of a property company; inputting curriculum vitaes, qualifications, temporary staff employment contracts and the like in cooperation with an intra-company operation system of a temporary staff employment company; inputting surveys, care records, daily reports and the like in cooperation with an intra-company operation system of a care company; and inputting curriculum vitaes, general affairs documents and the like in cooperation with a human resources system.

The present invention is not limited to the specifically disclosed embodiments, and variations and modifications may be made without departing from the scope of the present invention.

The present application contains subject matter related to Japanese patent application No. 2004-215701, filed in the JPO on Jul. 23, 2004, the entire contents of which are incorporated herein by reference.

What is claimed is:

1. An image data obtaining system for storing image data optically read from a digital compound machine into a database managed by a server connected to the digital compound machine via a network,
the digital compound machine comprising:
an input screen generation unit configured to generate an input screen based on input screen configuration information received from the server beforehand;
an image data information sending unit configured to send, to the server, the image data, image data information and a DB key value, wherein the image data information is for associating the image data with the input screen configuration information and is input from the input screen generated by the input screen generation unit, and wherein the DB key value is for associating the database with the input screen configuration information; and
an authentication unit configured to authenticate identity of a user,
the server comprising a DB storing unit configured to store the image data and/or the image data information received from the digital compound machine into the database associating the image data and/or the image data information with the DB key value,
wherein the input screen configuration information includes (i) process names, (ii) input items for each of the process names, and (iii) input types for each of the input items, the input types including (a) a setting specifying a method for inputting information of the input item, (b) a selector setting specifying selection information, and (c) a setting specifying whether identity authentication is required of an input item,
wherein the input screen generation unit generates and displays an input screen that includes the process names, and, when a process name is selected from among the process names on the input screen, the input screen generation unit generates and displays an input screen including input items corresponding to the selected process name,
wherein, if the input screen configuration information includes information, as an input type of an input item, indicating that identity authentication is required for the input item, the authentication unit performs identity authentication by displaying an authentication screen before the input screen that includes the input item is displayed,
wherein the input screen configuration information includes a selector information file including the selector information, item names, and the DB key value, and
when a selector input is performed by selecting the selector information, the input screen generation unit displays item names corresponding to the selector information by referring to the selector information file, and when an item name is selected, the DB key value corresponding to the selected item name is sent to the server.

2. The image data obtaining system as claimed in claim 1, wherein the digital compound machine includes a user authentication unit configured to authenticate a user.

3. An image data obtaining system for storing image data optically read from a digital compound machine into a database managed by a server connected to the digital compound machine via a network,
the digital compound machine comprising:
an input screen generation unit configured to generate an input screen based on input screen configuration information received from the server beforehand;
an image data information sending unit configured to send, to an intermediate data storing unit connected to the network, the image data, image data information and a DB key value, wherein the image data information is for associating the image data with the input screen configuration information and is input from the input screen generated by the input screen generation unit, and wherein the DB key value is for associating the database with the input screen configuration information; and
an authentication unit configured to authenticate identity of a user,
the server comprising a DB storing unit configured to store the image data and/or the image data information stored in the intermediate data storing unit into the database associating the image data and/or the image data information with the DB key value,
wherein the input screen configuration information includes (i) process names, (ii) input items for each of the process names, and (iii) input types for each of the input items, the input types including (a) a setting specifying a method for inputting information of the input item, (b) a selector setting specifying selection information, and (c) a setting specifying information indicating whether identity authentication is required of an input item,
wherein the input screen generation unit generates and displays an input screen that includes the process names, and, when a process name is selected from among the process names on the input screen, the input screen generation unit generates and displays an input screen including input items corresponding to the selected process name,
wherein, if the input screen configuration information includes information, as an input type of an input item, indicating that identity authentication is required for the input item, the authentication unit performs identity authentication by displaying an authentication screen before the input screen that includes the input item is displayed,
wherein the input screen configuration information includes a selector information file including the selector information, item names, and the DB key value, and
when a selector input is performed by selecting the selector information, the input screen generation unit displays item names corresponding to the selector information by referring to the selector information file, and when an item name is selected, the DB key value corresponding to the selected item name is sent to the server.

4. The image data obtaining system as claimed in claim 3, wherein the digital compound machine includes a user authentication unit configured to authenticate a user.

5. A digital compound machine for sending optically read image data to a server, that manages a database, connected to the digital compound machine via a network, the digital compound machine comprising:
an input screen generation unit configured to generate an input screen based on input screen configuration information received from the server beforehand; and
an image data information sending unit configured to send, to an image data storing apparatus storing the image data, the image data, image data information and a DB key value, wherein the image data information is for associating the image data with the input screen configuration information and is input from the input screen generated by the input screen generation unit, and wherein the DB key value is for associating the database with the input screen configuration information; and
an authentication unit configured to authenticate identity of a user,
wherein the input screen configuration information includes (i) process names, (ii) input items for each of the process names, and (iii) input types for each of the input items, the input types including (a) a setting specifying a method for inputting information of the input item, (b) a selector setting specifying selection information, and (c) a setting specifying information indicating whether identity authentication is required of an input item,
wherein the input screen generation unit generates and displays an input screen that includes the process names, and, when a process name is selected from among the process names on the input screen, the input screen generation unit generates and displays an input screen including input items corresponding to the selected process name;
wherein, if the input screen configuration information includes information, as an input type of an input item, indicating that identity authentication is required for the input item, the authentication unit performs identity authentication by displaying an authentication screen before the input screen that includes the input item is displayed,
wherein the input screen configuration information includes a selector information file including the selector information, item names, and the DB key value, and
when a selector input is performed by selecting the selector information, the input screen generation unit displays item names corresponding to the selector information by referring to the selector information file, and when an item name is selected, the DB key value corresponding to the selected item name is sent to the server.

6. The digital compound machine as claimed in claim 5, further comprising a user authentication unit configured to authenticate a user.

7. A system management server for receiving image data optically read by a digital compound machine via a network and storing the image data in a database, comprising:
a system information sending part configured to send, to the digital compound machine, input screen configuration information and a DB key value, wherein the input screen configuration information is used for configuring an input screen displayed on the digital compound machine, and wherein the DB key value is for associating the database with the input screen configuration information;
an image data information receiving unit configured to receive the image data, time certification data, and image data information, wherein the image data information is for associating the image data input from the input screen with the input screen configuration information;
an authentication information receiving unit configured to receive from the digital compound machine information authenticating identity of a user; and
a DB storing unit configured to store the image data and/or image data information received by the image data information receiving unit into the database associating the image data and/or image data information with the DB key value,
wherein the input screen configuration information includes (i) process names, (ii) input items for each of the process names, and (iii) input types for each of the input items, the input types including (a) a setting specifying a method for inputting information of the input item, (b) a selector setting specifying selection information, and (c) a setting specifying information indicating whether identity authentication is required of an input item,
wherein the input screen configuration information causes generating and displaying an input screen that includes the process names, and, when a process name is selected from among the process names on the input screen, an input screen including input items corresponding to the selected process name is generated and displayed,
wherein, if the input screen configuration information includes information, as an input type of an input item, indicating that identity authentication is required for the input item, an authentication screen is displayed before the input screen that includes the input item is displayed,
wherein the input screen configuration information includes a selector information file including the selector information, item names, and the DB key value, and
when a selector input is performed by selecting the selector information, the input screen generation unit displays item names corresponding to the selector information by referring to the selector information file, and when an item name is selected, the DB key value corresponding to the selected item name is sent to the server.

* * * * *